United States Patent
Morita et al.

(10) Patent No.: US 11,383,327 B2
(45) Date of Patent: Jul. 12, 2022

(54) ADDITIVE MANUFACTURING METHOD, MACHINING-PATH GENERATION METHOD, AND ADDITIVE MANUFACTURING DEVICE

(71) Applicant: Mitsubishi Electric Corporation, Tokyo (JP)

(72) Inventors: Daiji Morita, Tokyo (JP); Nobuhiro Shinohara, Tokyo (JP); Satoshi Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/278,663

(22) PCT Filed: Oct. 24, 2018

(86) PCT No.: PCT/JP2018/039543
§ 371 (c)(1),
(2) Date: Mar. 23, 2021

(87) PCT Pub. No.: WO2020/084715
PCT Pub. Date: Apr. 30, 2020

(65) Prior Publication Data
US 2021/0308796 A1    Oct. 7, 2021

(51) Int. Cl.
*B33Y 10/00*    (2015.01)
*B33Y 30/00*    (2015.01)
(Continued)

(52) U.S. Cl.
CPC ............ *B23K 26/342* (2015.10); *B22F 10/30* (2021.01); *B22F 10/85* (2021.01); *B22F 12/224* (2021.01);
(Continued)

(58) Field of Classification Search
CPC .. B23K 26/34–342; B33Y 10/00; B33Y 30/00
See application file for complete search history.

(56) References Cited

U.S. PATENT DOCUMENTS 8,097,825 B2 *  1/2012  Sato .................. B23K 35/0244
                                                    219/64
10,507,616 B2  12/2019  Tanaka
(Continued)

FOREIGN PATENT DOCUMENTS

JP    2013-501627 A    1/2013
JP     5391936 B2      1/2014
(Continued)

OTHER PUBLICATIONS

Office Action dated Mar. 29, 2021 for the corresponding European patent application No. 18 903 033.1.
(Continued)

*Primary Examiner* — Michael A LaFlame, Jr.
(74) *Attorney, Agent, or Firm* — Xsensus LLP

(57) ABSTRACT

An additive manufacturing method uses an additive manufacturing device performing additive machining by controlling a machining head including a nozzle to supply columnar build material to a machining region on a target surface and a beam nozzle to irradiate the machining region with beam melting the build material, the nozzle and the beam nozzle being provided non-coaxially. When additive machining is performed in a state where the machining head is located with central axes of the beam and the build material being positioned on a single vertical plane, the machining path is divided into divided machining paths such that the machining head is moved in one direction along a direction of the build-material central axis when motion of the machining head is projected onto a plane perpendicular to an irradiation direction of the beam, and the machining head is moved (Continued)

along each divided machining path to perform additive machining.

7 Claims, 14 Drawing Sheets

(51) Int. Cl.
  *B23K 26/34* (2014.01)
  *B23K 26/342* (2014.01)
  *B22F 12/53* (2021.01)
  *B22F 10/85* (2021.01)
  *B22F 12/41* (2021.01)
  *B22F 10/30* (2021.01)
  *B22F 12/00* (2021.01)
  *B23K 26/08* (2014.01)
  *B23K 26/14* (2014.01)
  *B33Y 50/02* (2015.01)

(52) U.S. Cl.
  CPC .............. *B22F 12/41* (2021.01); *B22F 12/53* (2021.01); *B23K 26/0876* (2013.01); *B23K 26/1464* (2013.01); *B33Y 10/00* (2014.12); *B33Y 30/00* (2014.12); *B33Y 50/02* (2014.12)

(56) References Cited

U.S. PATENT DOCUMENTS

| 10,831,181 | B2 | 11/2020 | Yamasaki |
| 2012/0193335 | A1 | 8/2012 | Guldberg |
| 2016/0107261 | A1 | 4/2016 | Guldberg |
| 2017/0008127 | A1 | 1/2017 | Hyatt et al. |
| 2017/0057011 | A1 | 3/2017 | Hyatt et al. |
| 2017/0182763 | A1* | 6/2017 | Sugai ................. B33Y 30/00 |
| 2017/0297323 | A1 | 10/2017 | Yamazaki et al. |
| 2018/0071986 | A1* | 3/2018 | Buller ................. G05B 19/4099 |
| 2018/0297260 | A1* | 10/2018 | Cappa ................. C22C 38/46 |

FOREIGN PATENT DOCUMENTS

| JP | 2016-182745 A | 10/2016 |
| JP | 2017-512896 A | 5/2017 |
| JP | 2017-144458 A | 8/2017 |
| JP | 2017-194942 A | 10/2017 |
| WO | 2017/180116 A1 | 10/2017 |
| WO | 2018/179632 A1 | 10/2018 |

OTHER PUBLICATIONS

International Search Report and Written Opinion dated Jan. 8, 2019, received for PCT Application PCT/JP2018/039543 Filed on Oct. 24, 2018, 8 pages including English Translation.
Extended European Search Report dated Apr. 2, 2020, received for EP Application 18903033.1, 8 pages.
Decision to Grant dated May 4, 2019, received for JP Application 2019-512338, 5 pages including English Translation.
Office Action dated Nov. 9, 2021, in corresponding Chinese patent Application No. 201880098826.2, 13 pages.
Office Action dated Feb. 10, 2022, in corresponding European patent Application No. 18 903 033.1, 5 pages.
Office Action dated Apr. 1, 2022, in corresponding Chinese patent application No. 201880098826.2.

* cited by examiner

ADDITIVE MANUFACTURING METHOD, MACHINING-PATH GENERATION METHOD, AND ADDITIVE MANUFACTURING DEVICE

CROSS-REFERENCE TO RELATED APPLICATION

The present application is based on PCT filing PCT/JP2018/039543, filed Oct. 24, 2018, the entire contents of which are incorporated herein by reference.

FIELD

The present invention relates to an additive manufacturing method for additively manufacturing a three-dimensional object, a machining-path generation method, and an additive manufacturing device.

BACKGROUND

A technique of manufacturing a three-dimensional object referred to as "AM (Additive Manufacturing)" has been conventionally well-known. There are multiple types of additive manufacturing methods including a DED (Directed Energy Deposition) method. The DED method has the advantages over other laminating methods, such as a shorter manufacturing time, easier changeover of laminating materials, and less limitation to the base-material type. The DED method only needs nearly the amount of material to be used for manufacturing and thus reduces the waste of material. Further, powder and wire can both be made available for use as materials by changing the machining head configuration. In particular, ready-made welding wires can be used for the wire, and the wire is thus commercially readily available at low cost.

Patent Literature 1 discloses a technique to set a path for laminating layers into a specified shape in accordance with the DED method. As this path, a tool path of a material supply nozzle is created so as to run in the reverse direction to a cutting path for cutting the specified shape with a tool.

CITATION LIST

Patent Literature

Patent Literature 1: Japanese Patent Application Laid-open No. 2017-194942

SUMMARY

Technical Problem

However, the tool path created by the technique disclosed in Patent Literature 1 described above does not take into account the fact that the welding process differs depending on the relative positional relation between the direction in which the wire is supplied and the advancement direction of the machining head. This degrades the accuracy in manufacturing an object with a shape in which a relative angle of the advancement direction of the machining head relative to the direction in which the wire is supplied is changed by a given angle or greater on the way through a manufacturing path when motion of the machining head is projected onto a plane perpendicular to the irradiation direction of a laser beam.

The present invention has been achieved to solve the above problems, and an object of the present invention is to provide an additive manufacturing method by which it is possible to improve the accuracy in manufacturing an object with a shape in which a relative angle of the advancement direction of a machining head relative to the direction in which a wire is supplied is changed by a given angle or greater on the way through a manufacturing path.

Solution to Problem

In order to solve the above problems and achieve the object, an additive manufacturing method according to an aspect of the present invention is an additive manufacturing method using an additive manufacturing device to perform additive machining by controlling a machining head that includes a nozzle to supply a columnar build material to a machining region on a target surface and a beam nozzle to irradiate the machining region with a beam that melts the build material supplied to the machining region, the nozzle and the beam nozzle being provided non-coaxially with each other. In the additive manufacturing method, when additive machining is performed along a desired machining path in a state where the machining head is located with a central axis of the beam and a central axis of the columnar build material being positioned on a single vertical plane, the machining path is divided into a plurality of divided machining paths in such a manner that the machining head is moved in one direction along a direction of a central axis of the columnar build material supplied to the machining region when motion of the machining head is projected onto a plane perpendicular to an irradiation direction of the beam, and the machining head is moved along each of the divided machining paths to perform additive machining.

Advantageous Effects of Invention

The additive manufacturing method according to the present invention has an effect where it is possible to improve the accuracy in manufacturing an object with a shape in which a relative angle of the advancement direction of a machining head relative to the direction in which a wire is supplied is changed by a given angle or greater on the way through a manufacturing path.

BRIEF DESCRIPTION OF DRAWINGS

FIG. 5 is viewed in a Y-axis direction parallel to the surface of a base material.

FIG. 8 is viewed in the Y-axis direction parallel to the surface of the base material.

DESCRIPTION OF EMBODIMENTS

An additive manufacturing method, a machining-path generation method, and an additive manufacturing device according to embodiments of the present invention will be described below in detail with reference to the accompanying drawings. The present invention is not limited to the embodiments.

First Embodiment

Figure 1:
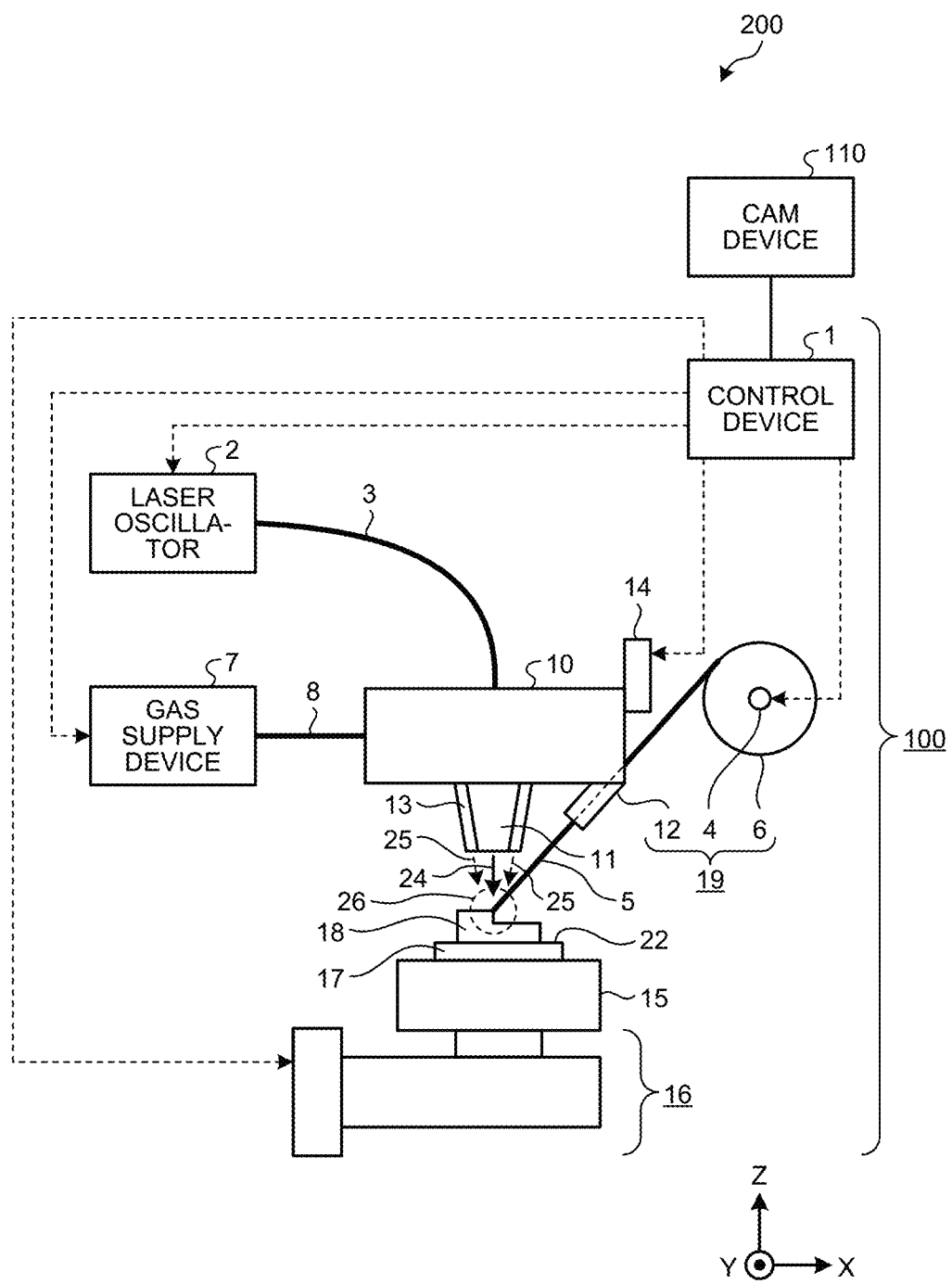
FIG. 1 is a diagram illustrating a configuration of an additive manufacturing system according to a first embodiment of the present invention.
Figure 2:
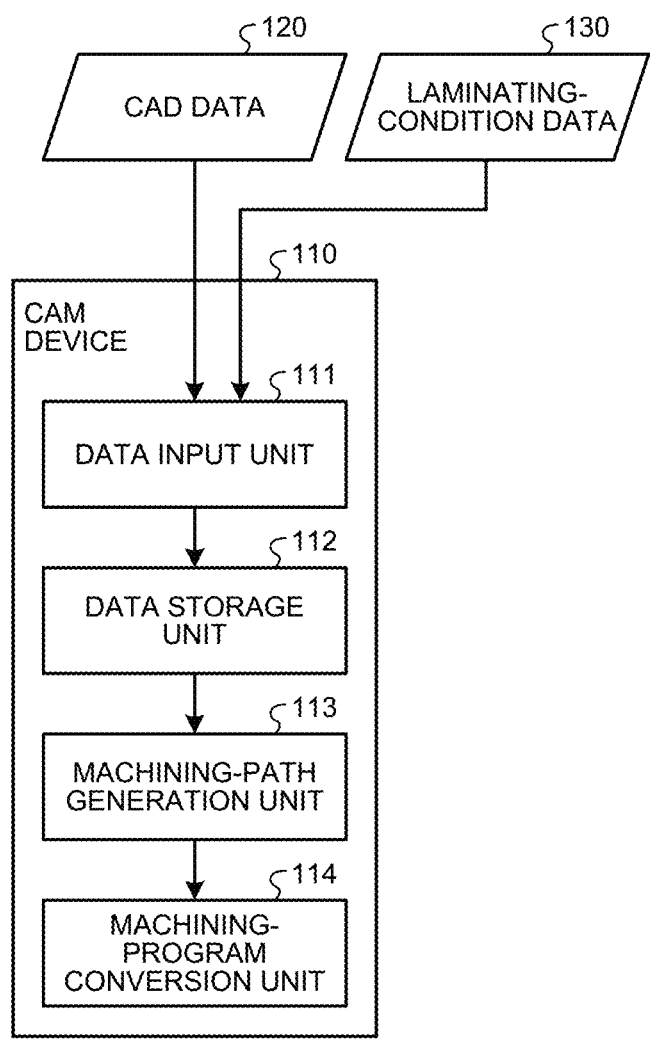
FIG. 2 is a block diagram illustrating a configuration of a CAM device according to the first embodiment of the present invention.

FIG. 1 is a diagram illustrating a configuration of an additive manufacturing system 200 according to a first embodiment of the present invention. FIG. 2 is a block diagram illustrating a configuration of a CAM (Computer Aided Manufacturing) device 110 according to the first embodiment of the present invention. An additive manufacturing device 100 is an additive manufacturing device that uses the DED method to manufacture a three-dimensional object by performing additive machining for adding a material melted by beam irradiation onto a target surface of a workpiece. In the first embodiment, the beam refers to a laser beam 24 and the material refers to a wire 5 that is made of metal and is a wire-like build material. The wire-like build material may also be a material other than a metal material. The additive manufacturing system 200 includes the additive manufacturing device 100 and the CAM device 110.

The additive manufacturing device 100 deposits a bead on a base material 17 so as to form a deposit 18 made of metal material on the surface of the base material 17. The bead is a substance formed by solidification of the molten wire 5 and makes up the deposit 18. In the first embodiment, a linear bead is formed. The linear bead is hereinafter referred to as "line bead". That is, the line bead is linear metal formed by solidification of the molten wire 5. The base material 17 is placed on a stage 15. The workpiece refers to the base material 17 and the deposit 18. The manufactured object refers to the deposit 18. The base material 17 illustrated in FIG. 1 is a plate. The base material 17 may also be a material other than a plate.

The additive manufacturing device 100 includes a machining head 10 including a beam nozzle 11, a wire nozzle 12, and a gas nozzle 13. The beam nozzle 11 emits the laser beam 24 toward a machining region 26 of a workpiece. The laser beam 24 is a heat source to melt a material. It is possible to use, for example, an electron beam or arc discharge as an energy source for melting a material other than the laser beam 24. The wire nozzle 12 advances the wire 5 toward the irradiation position of the laser beam 24 on a workpiece. That is, the wire nozzle 12 supplies the wire 5 toward the machining region 26 on a target surface 22 of a workpiece.

Instead of supplying the wire 5 from the wire nozzle 12 to the machining region 26, it is also possible for the additive manufacturing device 100 to employ a manufacturing method that sprays powdered metal as a build material from the nozzle. In a case where powdered metal as a build material is sprayed from the nozzle, a method using a negative pressure of shield gas, a method to pressurize and spray powdered metal from a powder delivery tube through which powdered metal is delivered at a certain manufacturing timing, and other methods are available. In this case, powdered metal is sprayed from the nozzle into a column-like shape and the central axis of the column-like shape corresponds to the central axis of the wire 5 to be supplied to the machining region 26. The wire 5 and powdered metal to be sprayed into a column-like shape make up the columnar build material to be supplied from the nozzle to the machining region 26.

The gas nozzle 13 sprays shield gas 25 toward the machining region 26 of a workpiece in order to suppress oxidization of the deposit 18 and cool the line bead. The beam nozzle 11, the wire nozzle 12, and the gas nozzle 13 are fixed to the machining head 10 so that the positional relation between these nozzles is uniquely defined. That is, the relative positional relation between the beam nozzle 11, the gas nozzle 13, and the wire nozzle 12 is fixed by the machining head 10.

A laser oscillator 2 oscillates the laser beam 24. The laser oscillator 2 is a beam source. The laser beam 24 from the laser oscillator 2 passes through a fiber cable 3 that is an optical transmission path, and then propagates to the beam nozzle 11. An irradiation unit is configured from the laser oscillator 2, the fiber cable 3, and the beam nozzle 11. The irradiation unit irradiates a workpiece with the laser beam 24 that melts the wire 5 such that the laser beam 24 is non-coaxial with the central axis of the wire 5. A gas supply device 7 supplies gas to the gas nozzle 13 through a pipe 8. A gas supply unit is configured from the gas supply device 7, the pipe 8, and the gas nozzle 13. The gas supply unit sprays the shield gas to the machining region 26.

The wire 5 is wound around a wire spool 6 that serves as a material supply source. A rotational motor 4 is a servo motor. As the rotational motor 4 is driven, the wire spool 6 rotates and thus the wire 5 is fed from the wire spool 6. The wire 5 having been fed from the wire spool 6 passes through the wire nozzle 12, and is supplied to the irradiation position of the laser beam 24. A wire supply unit 19 is configured from the rotational motor 4, the wire spool 6, and the wire nozzle 12.

A head drive device 14 moves the machining head 10 in each of an X-axis direction, a Y-axis direction, and a Z-axis direction. These three axes, i.e., the X-axis, the Y-axis, and the Z-axis, are perpendicular to one another. The X-axis and the Y-axis extend parallel to the horizontal direction. The Z-axis direction refers to the vertical direction. The head drive device 14 includes a servo motor that constitutes an operational mechanism to move the machining head 10 in the X-axis direction, a servo motor that constitutes an operational mechanism to move the machining head 10 in the Y-axis direction, and a servo motor that constitutes an operational mechanism to move the machining head 10 in the Z-axis direction. The head drive device 14 is an operational mechanism that enables transitional motion of the machining head 10 in each of the three axial directions. In FIG. 1, illustrations of the respective servo motors are omitted. In the additive manufacturing device 100, the head drive device 14 moves the machining head 10 so as to move the irradiation position of the laser beam 24 on a workpiece.

In the machining head 10 illustrated in FIG. 1, the beam nozzle 11 advances the laser beam 24 in the Z-axis direction. The wire nozzle 12 is located apart from the beam nozzle 11 on the X-Y plane. The wire nozzle 12 advances the wire 5 in an oblique direction relative to the Z-axis. That is, the wire nozzle 12 advances the wire 5 non-coaxially with the laser beam 24 emitted from the beam nozzle 11. The wire nozzle 12 is used to limit the advancement of the wire 5 such that the wire 5 is supplied to a desired position.

In the machining head 10 illustrated in FIG. 1, the gas nozzle 13 is provided on the outer peripheral side of the beam nozzle 11 on the X-Y plane such that it is coaxial with the beam nozzle 11. The gas nozzle 13 sprays gas along the central axis of the laser beam 24 emitted from the beam nozzle 11. That is, the beam nozzle 11 and the gas nozzle 13 are located coaxially with each other. The machining head 10 can have a configuration in which a swivel shaft is added thereto.

Figure 3:
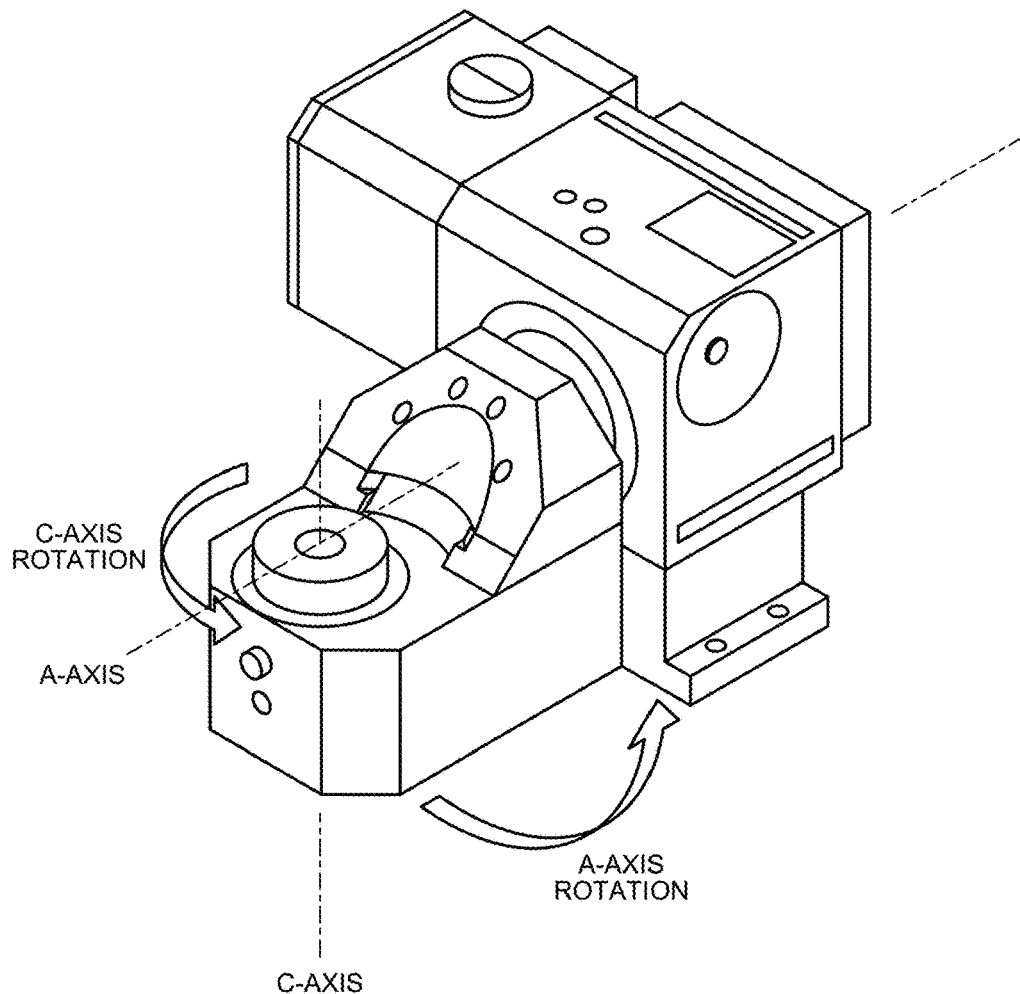
FIG. 3 is a diagram illustrating rotational directions of a rotational mechanism of an additive manufacturing device according to the first embodiment of the present invention.

A rotational mechanism 16 is an operational mechanism that enables the stage 15 to rotate about a first shaft and to rotate about a second shaft perpendicular to the first shaft. In the rotational mechanism 16 illustrated in FIG. 1, the first shaft is an A shaft extending parallel to the X-axis, and the second shaft is a C shaft extending parallel to the Z-axis. The rotational mechanism 16 includes a servo motor that constitutes an operational mechanism to rotate the stage 15 about the first shaft, and a servo motor that constitutes an operational mechanism to rotate the stage 15 about the second shaft. The rotational mechanism 16 is an operational mechanism that enables rotational motion of the stage 15 about each of the two axes. In FIG. 1, illustrations of the respective servo motors are omitted. In the additive manufacturing device 100, the rotational mechanism 16 rotates the stage 15 to thereby change the attitude or position of a workpiece. By using the rotational mechanism 16, the additive manufacturing device 100 can shape a workpiece into even a complex tapered shape. FIG. 3 is a diagram illustrating rotational directions of the rotational mechanism 16 of the additive manufacturing device 100 according to the first embodiment of the present invention. The rotational mechanism 16 illustrated in FIG. 3 is capable of rotating a C-axis table itself in the A-axis direction.

A control device 1 controls the additive manufacturing device 100 in accordance with a machining program transmitted from the CAM device 110. By indicating a movement path along which the machining head 10 is moved relative to a workpiece placed on the stage 15, the machining program specifies a machining path that is a path to manufacture a three-dimensional object and is a path along which the irradiation position of the laser beam 24 is moved.

The control device 1 controls the wire supply unit 19, the irradiation unit, and the gas supply unit so as to execute control for manufacturing an object from a plurality of line beads formed by melting the wire 5. For example, a numerical control device is used as the control device 1. The control device 1 outputs a movement command to the head drive device 14 so as to control drive of the head drive device 14 and move the machining head 10. The control device 1 outputs a command to the laser oscillator 2 in accordance with beam-output conditions to control laser oscillation by the laser oscillator 2.

The control device 1 outputs, to the rotational motor 4, a command that is in accordance with conditions for the material supply amount so as to control drive of the rotational motor 4. The control device 1 controls drive of the rotational motor 4 so as to adjust the supply rate of the wire 5 to be fed from the wire spool 6 toward the irradiation position. In the following descriptions, this rate is sometimes referred to as "wire supply volume rate".

The control device 1 outputs, to the gas supply device 7, a command that is in accordance with conditions for the gas supply amount to control the amount of the shield gas 25 to be supplied from the gas supply device 7 to the gas nozzle 13. The control device 1 outputs a rotational command to the rotational mechanism 16 so as to control drive of the rotational mechanism 16. That is, the control device 1 outputs various types of commands to thereby control the additive manufacturing device 100 in its entirety.

The head drive device 14 and the rotational mechanism 16 are operated in conjunction with each other to actuate the machining head 10 and the stage 15, so that the position of the machining region 26 can be changed and thus a manufactured object with a desired shape can be obtained.

A hardware configuration of the control device 1 is described here. The control device 1 illustrated in FIG. 1 is implemented by hardware executing a control program that is a program for controlling the additive manufacturing device 100 according to the first embodiment.

Figure 4:
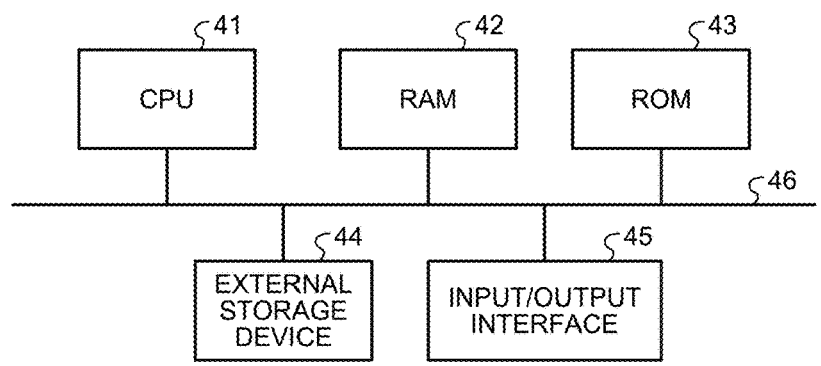
FIG. 4 is a block diagram illustrating a hardware configuration of a control device according to the first embodiment.

FIG. 4 is a block diagram illustrating a hardware configuration of the control device 1 according to the first embodiment. The control device 1 includes a CPU (Central Processing Unit) 41 executing various types of processing, a RAM (Random Access Memory) 42 including a data storage area, a ROM (Read Only Memory) 43 that is a nonvolatile memory, an external storage device 44, and an input/output interface 45 that inputs and outputs information to and from the control device 1. The units illustrated in FIG. 4 are connected to each other through a bus 46.

The CPU 41 executes programs stored in the ROM 43 and the external storage device 44. The additive manufacturing device 100 is controlled in its entirety by the control device 1 using the CPU 41.

The external storage device 44 is an HDD (Hard Disk Drive) or an SSD (Solid State Drive). The external storage device 44 stores therein the control program and various types of data. The ROM 43 has stored therein a boot loader that is software or a program to control the hardware, such as a BIOS (Basic Input/Output System) or a UEFI (Unified Extensible Firmware Interface) that is a basic control program for a computer or controller that is the control device 1. It is allowable that the control program is stored in the ROM 43.

The programs stored in the ROM 43 and the external storage device 44 are loaded to the RAM 42. The CPU 41 loads the control program into the RAM 42 to perform various types of processing. The input/output interface 45 is a connection interface connected with devices outside the control device 1. A machining program is input to the input/output interface 45. The input/output interface 45 outputs various types of commands. It is allowable that the control device 1 includes an input device, such as a keyboard and a pointing device, and an output device, such as a display.

The control program may be a program stored in a computer-readable storage medium. It is allowable that the control device 1 stores, into the external storage device 44, the control program that has been stored in the storage medium. The storage medium may be a portable storage medium that is a flexible disk or may be a flash memory that is a semiconductor memory. It is also allowable to install a control program from another computer or a sever device on the computer or the controller that serves as the control device 1 through a communication network.

The functions of the control device 1 may be implemented by a processing circuit that is hardware dedicated to controlling the additive manufacturing device 100. The processing circuit is a single circuit, a complex circuit, a programmed processor, a parallel-programmed processor, an ASIC (Application Specific Integrated Circuit), an FPGA (Field Programmable Gate Array), or a combination thereof. The functions of the control device 1 may be partially implemented by hardware, while being partially implemented by software or firmware.

The CAM device 110 is a machining-program generation device that generates a machining program to control operation of the additive manufacturing device 100. The CAM device 110 includes a data input unit 111, a data storage unit 112, a machining-path generation unit 113, and a machining-program conversion unit 114. The respective constituent units of the CAM device 110 are capable of transmitting and receiving information to and from each other.

The data input unit 111 receives CAD (Computer-Aided Design) data 120 that is manufacturing-shape data input to the CAM device 110 from a device external to the CAM device 110, and transmits the CAD data 120 to the data storage unit 112. The manufacturing-shape data includes information on a manufacturing-target shape that is a finished shape of a manufactured object additively manufactured by the additive manufacturing device 100 and includes information on the raw-material type. The manufacturing-target shape is a final three-dimensional shape. The manufacturing-shape data is not limited to the CAD data 120. It is sufficient if the manufacturing-shape data is at least data interpretable at the CAM device 110.

The data input unit 111 receives line-bead formation information input by a user and transmits the received information to the data storage unit 112. The line-bead formation information indicates conditions for forming a line bead. The line-bead formation information indicates a shape of the line bead and is used to generate a machining program described below. The line-bead formation information includes information on the width of the line bead and the height of the line bead.

The data storage unit 112 stores therein the manufacturing-shape data transmitted from the data input unit 111.

The machining-path generation unit 113 receives the CAD data 120 transmitted from the data input unit 111. By analyzing the CAD data 120 and laminating-condition data 130, the machining-path generation unit 113 generates and transmits a machining path to the machining-program conversion unit 114. The laminating-condition data 130 is used to control lamination of the beads. The machining path is a path along which line-bead additive machining is performed, and is a tool path of the machining head 10. The machining program specifies a machining path by indicating the route of the machining head 10 intended to form the line bead.

The machining-program conversion unit 114 receives the machining-path information transmitted from the machining-path generation unit 113. The machining-program conversion unit 114 converts the machining-path information generated by the machining-path generation unit 113 into a machining program, and transmits the machining program to the control device 1.

The CAM device 110 illustrated in FIG. 2 is implemented by hardware having the configuration as illustrated in FIG. 3 executing a control program that is a program for controlling the CAM device 110. The functions of the CAM device 110 may be implemented by a processing circuit that is hardware dedicated to controlling the CAM device 110.

Next, a description is given of degradation in manufacturing accuracy attributable to the relation between the direction in which the wire 5 is supplied and the advancement direction of the machining head 10 when the additive manufacturing device 100 according to the first embodiment moves the machining head 10 in a direction parallel to the X-Y plane to perform additive machining along a curved line.

Figure 5:
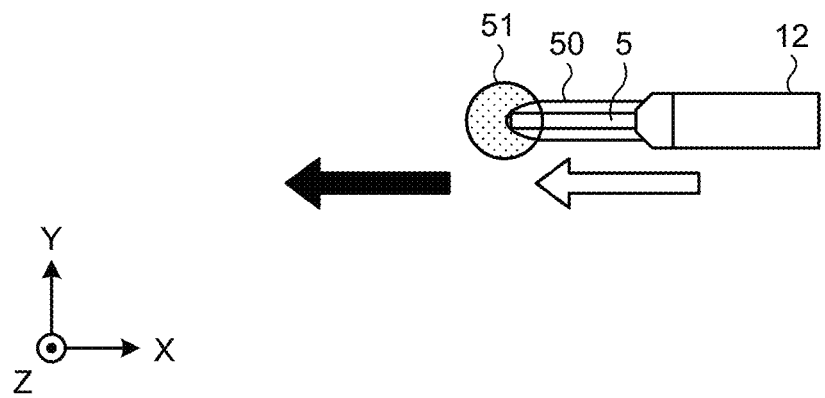
FIG. 5 is a diagram illustrating a first state where the direction in which a wire is supplied is the same as the advancement direction of a machining head.
Figure 6:
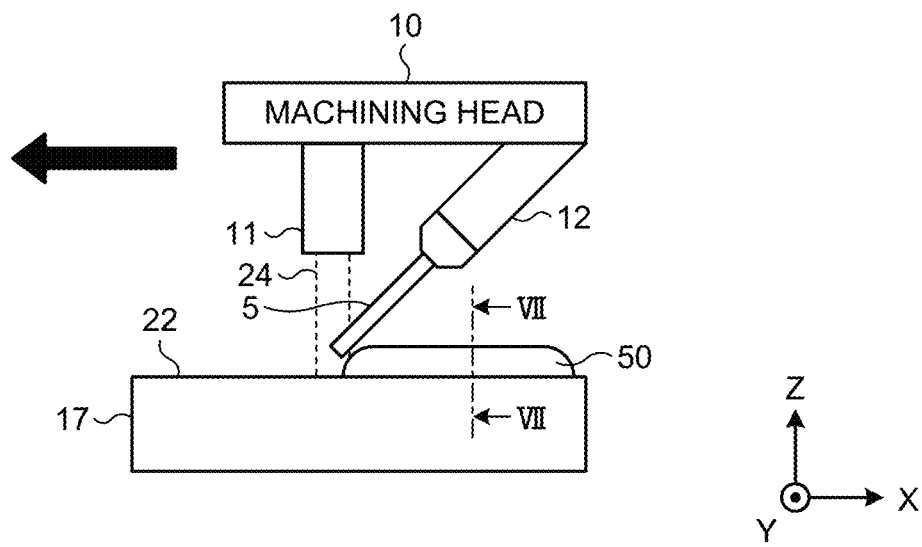
FIG. 6 is a diagram when
Figure 7:
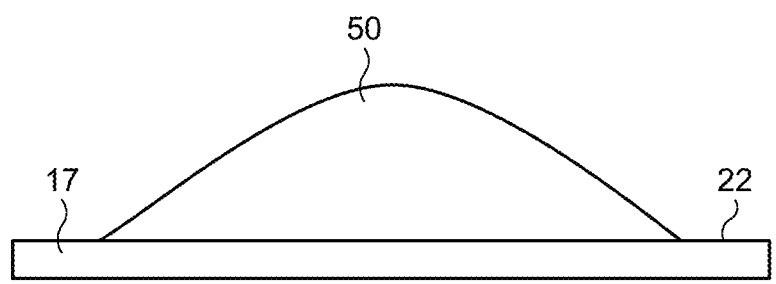
FIG. 7 is a diagram illustrating a cross-sectional shape of a bead taken along line VII-VII in FIG. 6 and viewed in the arrow direction.
Figure 8:
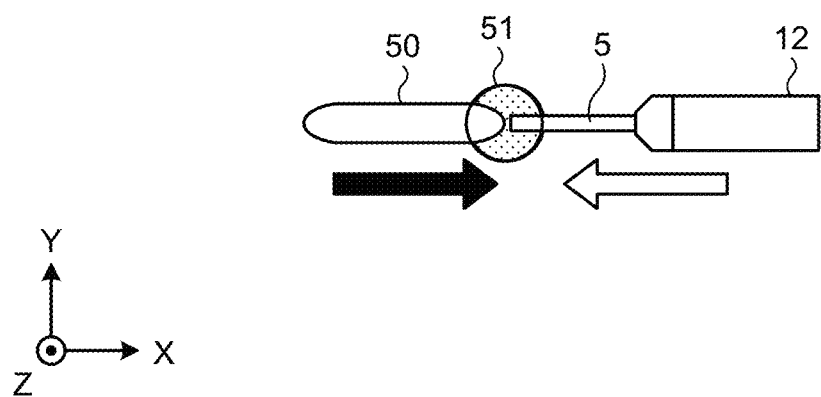
FIG. 8 is a diagram illustrating a second state where the direction in which the wire is supplied is opposite to the advancement direction of the machining head.
Figure 9:
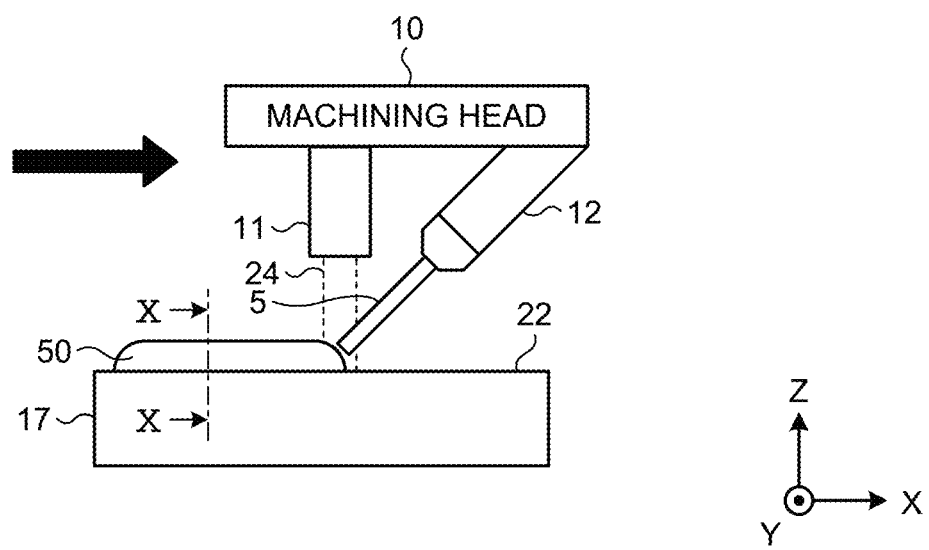
FIG. 9 is a diagram when
Figure 10:
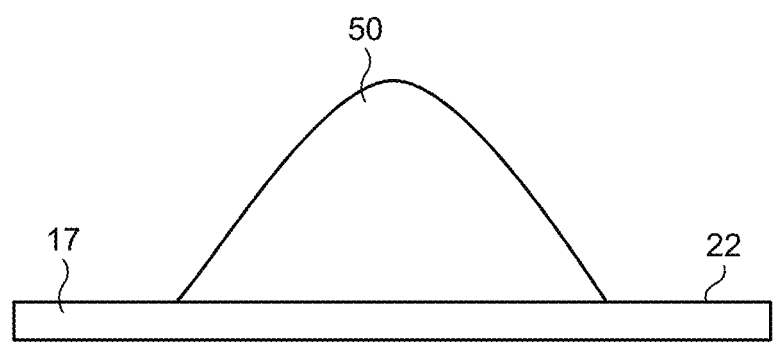
FIG. 10 is a diagram illustrating a cross-sectional shape of the bead taken along line X-X in FIG. 9 and viewed in the arrow direction.

FIG. 5 is a diagram illustrating a first state where the direction in which the wire 5 is supplied is the same as the advancement direction of the machining head 10. FIG. 5 is a diagram of a bead 50 when viewed in the Z-axis direction that is the irradiation direction of the laser beam 24. FIG. 6 is a diagram when FIG. 5 is viewed in the Y-axis direction parallel to the surface of the base material 17. FIG. 7 is a diagram illustrating a cross-sectional shape of the bead 50 taken along line VII-VII in FIG. 6 and viewed in the arrow direction. FIG. 8 is a diagram illustrating a second state where the direction in which the wire 5 is supplied is opposite to the advancement direction of the machining head 10. FIG. 8 is a diagram of the bead 50 when viewed in the Z-axis direction that is the irradiation direction of the laser beam 24. FIG. 9 is a diagram when FIG. 8 is viewed in the Y-axis direction parallel to the surface of the base material 17. FIG. 10 is a diagram illustrating a cross-sectional shape of the bead 50 taken along line X-X in FIG. 9 and viewed in the arrow direction. In FIGS. 5, 6, 8, and 9, the direction in which the wire 5 is supplied is shown by a white arrow, while the advancement direction of the machining head 10 is shown by a black arrow.

As illustrated in FIG. 5, in the first state where the direction in which the wire 5 is supplied is the same as the advancement direction of the machining head 10, the percentage of the amount of beam irradiation of the base material 17 that is blocked by the wire 5 immediately before additive machining in a laser-beam irradiation region 51 is lower than the case in FIG. 8. In the first state, the wire 5 is fed and melts on the bead line on the lower layer preheated by passage of the laser beam 24. In FIG. 5, the wire 5 is at a position overlapping with the bead 50 when viewed in the irradiation direction of the laser beam 24. Thus, the area of the portion in which the base material 17 is covered in the laser-beam irradiation region 51 is only the area of the bead 50.

Accordingly, in the laser-beam irradiation region 51 in FIG. 5, the area where the base material 17 is directly irradiated with the laser beam 24 immediately before additive machining is larger than the case in FIG. 8. As a result of this, preheating of the base material 17 is greater than the case in FIG. 8, and thus the temperature gradient during cooling becomes more moderate. For this reason, as illustrated in FIG. 7, the bead 50 tends to have a larger bead width and a smaller bead height than those in FIG. 10.

In contrast to this, as illustrated in FIG. 8, in the second state where the direction in which the wire 5 is supplied is opposite to the advancement direction of the machining head 10, the percentage of the amount of beam irradiation of the base material 17 that is blocked by the wire 5 immediately before additive machining in the laser-beam irradiation region 51 is higher than the case in FIG. 5. In the second state, the laser beam 24 passes following the wire 5 fed from the wire nozzle 12 and melts the wire 5. In FIG. 8, the area of the portion in which the base material 17 is covered in the laser-beam irradiation region 51 corresponds to the area of the bead 50 and the area of the wire 5 when viewed in the irradiation direction of the laser beam 24.

Accordingly, in the laser-beam irradiation region 51 in FIG. 8, the area where the base material 17 is directly irradiated with the laser beam 24 immediately before additive machining is smaller than the case in FIG. 5. As a result of this, preheating of the base material 17 is smaller than the case in FIG. 5, and thus the temperature gradient during cooling becomes shaper. For this reason, as illustrated in FIG. 10, the bead 50 tends to have a smaller bead width and a larger bead height than those in FIG. 7. As explained above, FIG. 5 and FIG. 8 lead to different results of bead width and different results of bead height from each other.

That is, in a case where a machining path for a manufactured object includes a machining path leading to the first state and a machining path leading to the second state, a bead, formed by additive machining that follows the machining path leading to the first state, has a bead width and a bead height that are different from those of a bead, formed by additive machining that follows the machining path leading to the second state. For this reason, the shape of the beads becomes uneven, which degrades the shape accuracy of the manufactured object. That is, as the melting and solidification process of the wire 5 differs in the first state and the second state, the wire 5 melts in different manners and the beads have different shapes. This degrades the shape accuracy of the manufactured object.

The additive manufacturing device 100 divides a machining path for a manufactured object into the machining path leading to the first state and the machining path leading to the second state, which are included in the machining path when viewed in the irradiation direction of the laser beam 24, and moves the machining head 10 along each of the machining paths obtained by division to perform additive machining. The phrase "when viewed in the irradiation direction of the laser beam 24" can be rephrased as "when motion of the machining head 10 is projected onto a plane perpendicular to the irradiation direction of the laser beam 24". More specifically, projecting motion of the machining head 10 means projecting a machining path intended to perform additive machining by moving the machining head 10. When the additive manufacturing device 100 forms a manufactured object, the additive manufacturing device 100 performs additive machining along a plurality of machining paths obtained by division under the division conditions that "the central axis of the laser beam 24 emitted to the machining region 26 and the central axis of the wire 5 supplied to the machining region 26 non-coaxially with the laser beam 24 emitted to the machining region 26 are both oriented on a single vertical plane, and the machining head 10 is moved in one direction along the direction of the central axis of the wire 5 supplied to the machining region 26 when viewed in the irradiation direction of the laser beam 24".

That is, provided that the machining head 10 is moved in one direction along the direction of the central axis of the wire 5 supplied to the machining region 26 when viewed in the irradiation direction of the laser beam 24 in a state where the central axis of the laser beam 24 emitted to the machining region 26 and the central axis of the wire 5 supplied to the machining region 26 non-coaxially with the laser beam 24 emitted to the machining region 26 are both oriented on a single vertical plane, the additive manufacturing device 100 divides a machining path for a manufactured object into a plurality of divided machining paths, and then moves the machining head 10 along each of the divided machining paths to perform additive manufacturing. The phrase "the central axis of the laser beam 24 emitted to the machining region 26 and the central axis of the wire 5 supplied to the machining region 26 non-coaxially with the laser beam 24 emitted to the machining region 26" can be rephrased as "the central axis of the beam nozzle 11 and the central axis of the wire nozzle 12". Due to the above configuration, the additive manufacturing device 100 prevents degradation in shape accuracy in manufacturing an object with a shape formed by a mixture of the machining path leading to the first state and the machining path leading to the second state when viewed in the irradiation direction of the laser beam 24, and thus can improve the shape accuracy in manufacturing the object.

Figure 11:
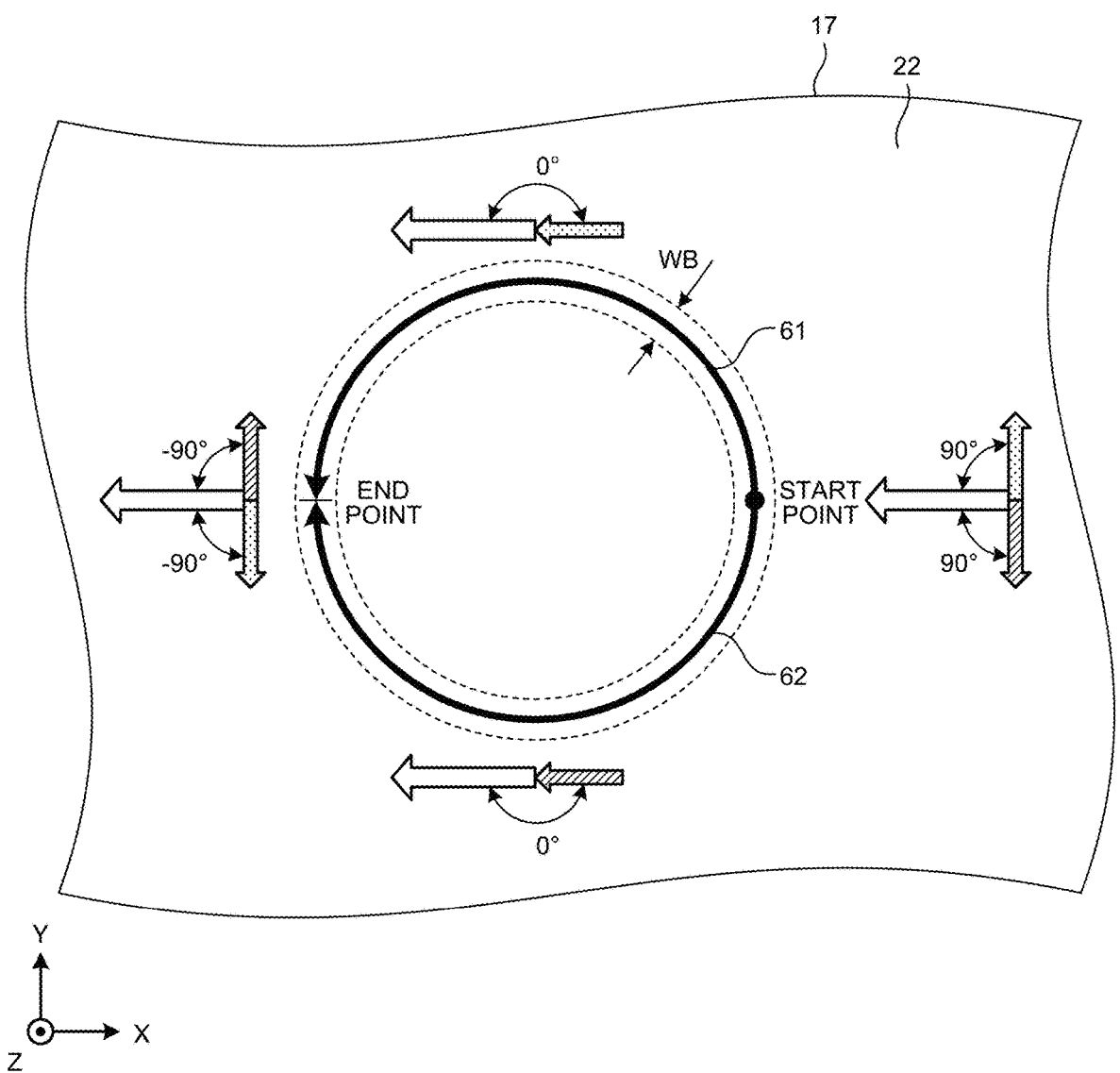
FIG. 11 is a diagram illustrating an example of a machining path for manufacturing a circular object by the additive manufacturing device according to the first embodiment of the present invention.
Figure 12:
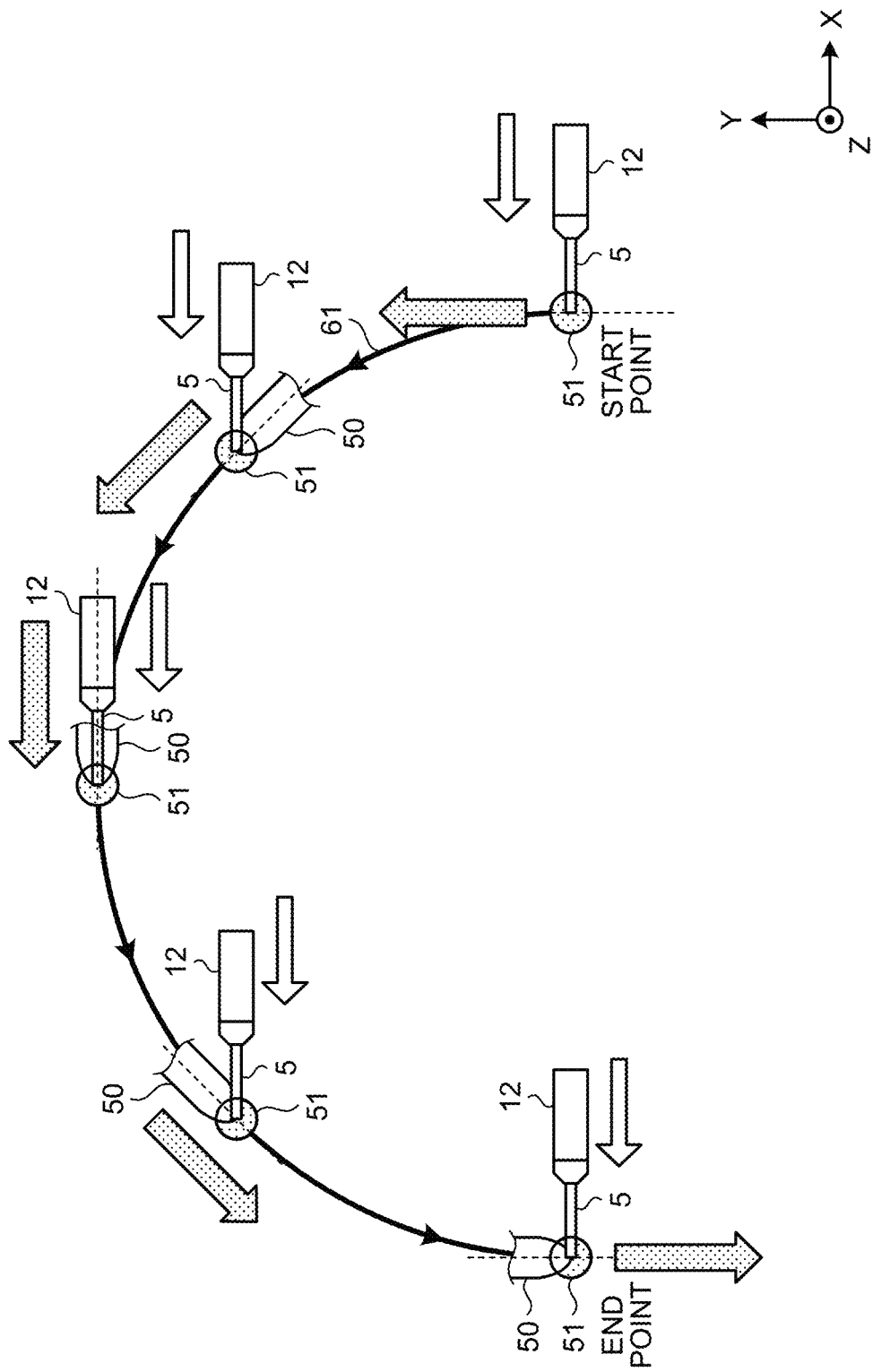
FIG. 12 is a diagram illustrating the relation between the direction in which the wire is supplied and the advancement direction of the machining head on a first semicircular machining path according to the first embodiment of the present invention.
Figure 13:
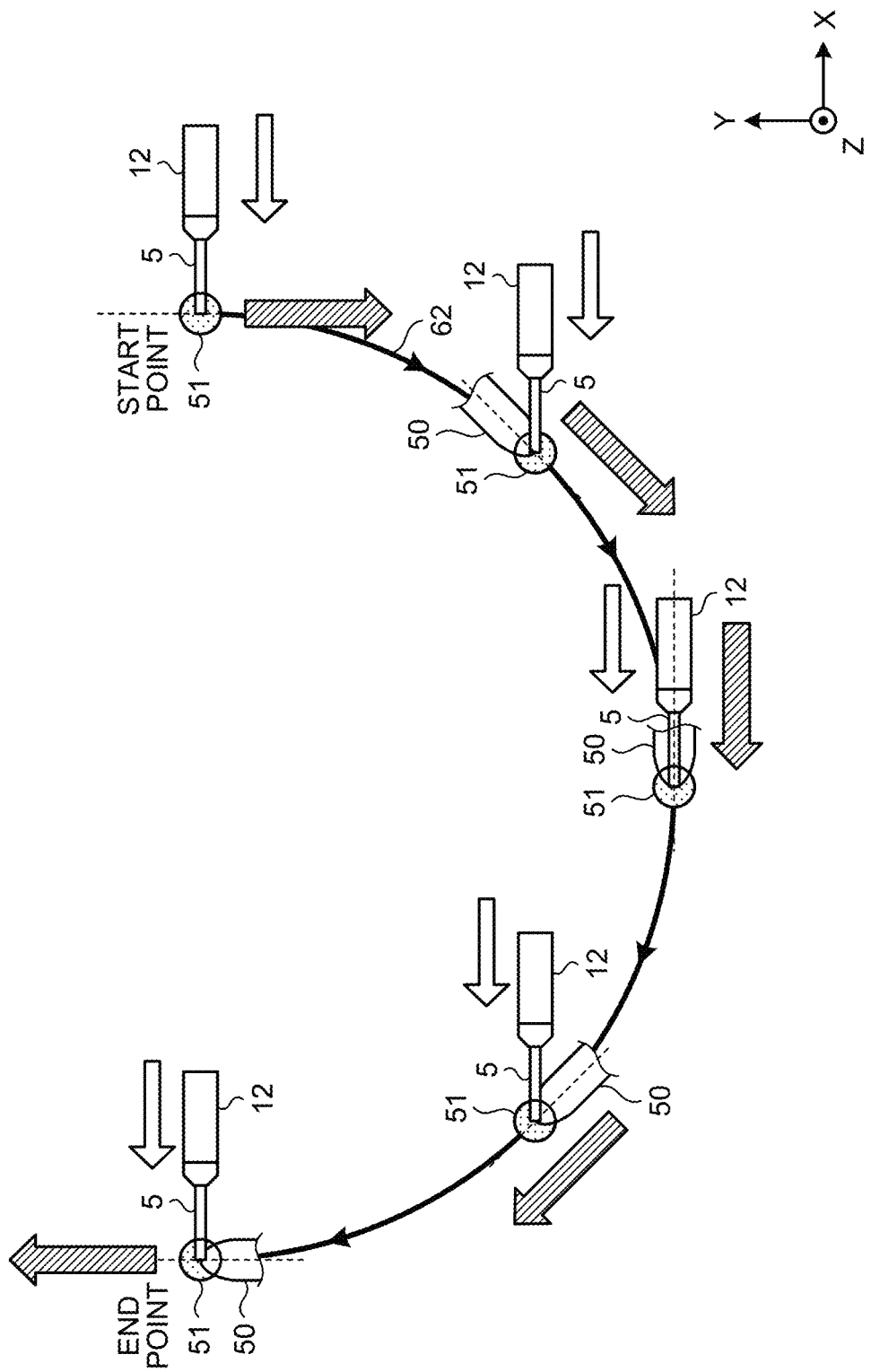
FIG. 13 is a diagram illustrating the relation between the direction in which the wire is supplied and the advancement direction of the machining head on a second semicircular machining path according to the first embodiment of the present invention.

The additive manufacturing method for the additive manufacturing device 100 to manufacture a circular object is described below. FIG. 11 is a diagram illustrating an example of a machining path for manufacturing a circular object by the additive manufacturing device 100 according to the first embodiment of the present invention. FIG. 11 illustrates two semicircular machining paths obtained by dividing a circular machining path made up of a closed curve. In FIG. 11, the direction in which the wire 5 is supplied is shown by a white arrow, the advancement direction of the machining head 10 on a first semicircular machining path 61 is shown by a dot-patterned arrow, and the advancement direction of the machining head 10 on a second semicircular machining path 62 is shown by a hatched arrow. FIG. 12 is a diagram illustrating the relation between the direction in which the wire 5 is supplied and the advancement direction of the machining head 10 on the first semicircular machining path 61 according to the first embodiment of the present invention. FIG. 13 is a diagram illustrating the relation between the direction in which the wire 5 is supplied and the advancement direction of the machining head 10 on the second semicircular machining path 62 according to the first embodiment of the present invention.

The additive manufacturing device 100 moves the machining head 10 along the first semicircular machining path 61 and the second semicircular machining path 62, which are obtained by dividing the circular machining path as illustrated in FIG. 11, to perform additive machining so as to form beads with a desired bead width WB and thus form a circular manufactured object. The first semicircular machining path 61 and the second semicircular machining path 62 are obtained by dividing a circular machining path on the basis of the division conditions described above. In the example illustrated in FIG. 11, a single vertical plane is the X-Z plane. In the example illustrated in FIG. 11, the machining head 10 is moved in the negative direction of the X-axis in the direction along the central axis of the wire 5 supplied to the machining region 26 when viewed in the irradiation direction of the laser beam 24.

Both the start point and the end point of the first semicircular machining path 61 and the second semicircular machining path 62 are on the X-axis. On the first semicircular machining path 61 and the second semicircular machining path 62, the angle of the advancement direction of the machining head 10 relative to the direction in which the wire 5 is supplied falls within a predetermined range of allowable head angle between "90 degrees" and "−90 degrees". The allowable head angle indicates an angle that the angle of the advancement direction of the machining head 10 relative to the direction in which the wire 5 is supplied when viewed in the irradiation direction of the laser beam 24 satisfies, where the division condition described above that "the machining head 10 is moved in one direction along the direction of the central axis of the wire 5 supplied to the machining region 26 when viewed in the irradiation direction of the laser beam 24" is satisfied.

That is, a machining path is divided into the first semicircular machining path 61 and the second semicircular machining path 62 at a point where the advancement direction of the machining head 10 exceeds a predetermined allowable head angle.

When the machining head 10 moves on the first semicircular machining path 61, the machining head 10 moves only in the negative direction in the X-axis direction as illustrated in FIG. 12. When the machining head 10 moves on the first semicircular machining path 61, the first state occurs but the second state does not occur. When the machining head 10 moves on the second semicircular machining path 62, the machining head 10 moves only in the negative direction in the X-axis direction as illustrated in FIG. 13. When the machining head 10 moves on the second semicircular machining path 62, the first state occurs but the second state does not occur. On the first semicircular machining path 61 and the second semicircular machining path 62, the angle of the advancement direction of the machining head 10 relative to the direction in which the wire 5 is supplied falls within the range of allowable head angle between "90 degrees" and "−90 degrees". That is, the angular positional relation of the advancement direction of the machining head 10 relative to the direction in which the wire 5 is supplied is maintained within a given range.

Due to this relation, on the entire machining path including the first semicircular machining path 61 and the second semicircular machining path 62, the positional relation between the direction in which the wire 5 is supplied and the advancement direction of the machining head 10 is maintained within a predetermined range where only one of the first state and the second state occurs on the entire machining path. Due to this relation, when the additive manufacturing device 100 performs additive machining on a circular manufactured object, the additive manufacturing device 100 can improve the uniformity in the width WB and height of the beads formed and thus improve the roundness of the manufactured object. That is, the additive manufacturing device 100 prevents degradation in shape accuracy of a manufactured object caused by inclusion of the machining path leading to the first state and the machining path leading to the second state in the machining path made up of a closed curve when viewed in the irradiation direction of the laser beam 24. The additive manufacturing device 100 thus can improve the shape accuracy of the manufactured object with a shape made up of a closed curve when viewed in the irradiation direction of the laser beam 24.

The first semicircular machining path 61 and the second semicircular machining path 62 are generated such that the machining head 10 moves only in the negative direction in the X-axis direction. However, for example, depending on the material properties of the wire 5, it is possible that the first semicircular machining path 61 and the second semicircular machining path 62 are generated such that the machining head 10 moves only in the positive direction in the X-axis direction. In this case, the same effects as those described above are also obtained.

The axial configurations in the machining head 10 and the rotational mechanism 16 and the configurations of the nozzles of the machining head 10 are not limited to the configurations described above, but can be modified. That is, it is also possible to locate the wire nozzle 12 and the gas nozzle 13 coaxially with each other, and it is also possible to locate the beam nozzle 11 and the gas nozzle 13 non-coaxially with each other. However, non-uniformity in the width WB and height of the beads in the first state and the second state described above also has a dependence on the direction in which the shield gas 25 is sprayed to the machining region 26. For this reason, in a case where the central axis of the laser beam 24 emitted to the machining region 26 is not coaxial with the central axis of the wire 5 supplied to the machining region 26 non-coaxially with the laser beam 24 emitted to the machining region 26, the influence of the shield gas 25 also needs to be taken into account.

In the additive manufacturing method according to the first embodiment, since operation to manufacture a circular object can be performed by moving the machining head 10 in the X-axis direction, the Y-axis direction, and the Z-axis direction, there is no constraint that the C-axis table is needed. This makes it possible for the additive manufacturing device 100 to manufacture a circular object at any position of a workpiece when the additive manufacturing device 100 has a multi-axis configuration, and thus the degree of freedom in manufacturing improves.

If a machining path for a manufactured object includes both the machining path leading to the first state and the machining path leading to the second state when viewed in the irradiation direction of the laser beam 24, and the machining path is not divided, the angular positional relation of the advancement direction of the machining head 10 relative to the direction in which the wire 5 is supplied is not maintained within a given range. Thus, the machining path leading to the first state and the machining path leading to the second state appear alternately. Accordingly, a state where the laser beam 24 passes following the wire 5 fed from the wire nozzle 12 and melts the wire 5 and a state where the wire 5 is fed and melts on the bead line on the lower layer preheated by passage of the laser beam 24 occur alternately. Therefore, as the melting and solidification process of the wire 5 differs in each of the states described above, the wire 5 melts in different manners and the beads have different shapes. This degrades the shape accuracy of the manufactured object.

The additive manufacturing method described above may also be applied to a case where, instead of supplying the wire 5 from the wire nozzle 12 to the machining region 26, powdered metal as a build material is sprayed from the nozzle to the machining region 26. In this case, the same effects as those described above are also obtained.

As described above, the additive manufacturing method according to the first embodiment achieves an effect of improving the accuracy in manufacturing an object with a shape formed by a mixture of the machining path leading to the first state and the machining path leading to the second state when viewed in the irradiation direction of the laser beam 24. That is, the additive manufacturing method according to the first embodiment achieves an effect of improving the accuracy in manufacturing an object with a shape in which a relative angle of the advancement direction of the machining head 10 relative to the direction in which the wire 5 is supplied is changed by a given angle or greater on the way through a manufacturing path.

Second Embodiment

In a second embodiment, descriptions are given of a machining-path generation method for generating a machining path intended to execute control on the additive manufacturing device 100 in accordance with the additive manufacturing method explained in the first embodiment described above.

Figure 14:
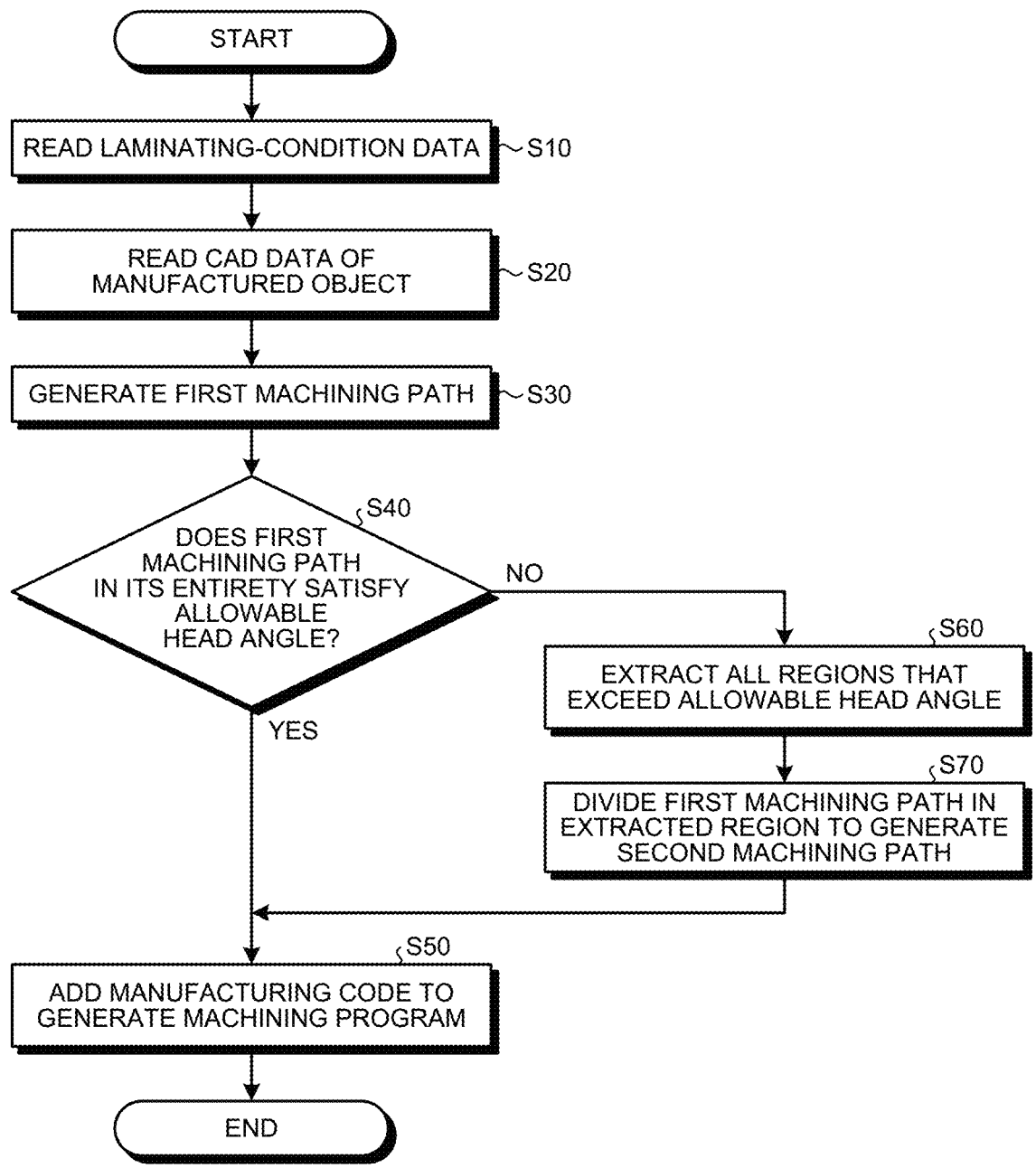
FIG. 14 is a flowchart illustrating a procedure of a machining-program generation process in the CAM device illustrated in FIG. 2.

FIG. 14 is a flowchart illustrating a procedure of a machining-program generation process in the CAM device 110 illustrated in FIG. 2. In the machining-program generation process, a machining program is generated that is intended to implement the additive manufacturing method explained in the first embodiment described above.

First, at Step S10, the laminating-condition data 130 input by a user is received by the data input unit 111 and stored in the data storage unit 112. The machining-path generation unit 113 reads and obtains the laminating-condition data 130 stored in the data storage unit 112, and then stores the obtained laminating-condition data 130 in a storage unit (not illustrated) inside the machining-path generation unit 113. Examples of the laminating conditions include the laminating pitch, the bead width, the allowable head angle, the upper limit of laser output, the laser focus distance, the wire supply rate, the material type of the wire 5, and the movable-shaft configuration.

Next, at Step S20, the machining-path generation unit 113 reads and obtains the CAD data 120 stored in the data storage unit 112, and then stores the obtained CAD data 120 in the storage unit (not illustrated) inside the machining-path generation unit 113.

Subsequently, at Step S30, the machining-path generation unit 113 generates a first machining path on the basis of a manufacturing-target shape represented by the CAD data 120 and the laminating-condition data 130. The first machining path is a basic machining path for generating a second machining path described below. The first machining path includes a machining path intended to manufacture a manufacturing-target shape using the existing method.

Next, at Step S40, the machining-path generation unit 113 determines whether the first machining path in its entirety satisfies the allowable head angle. When the first machining path in its entirety satisfies the allowable head angle, the determination is YES at Step S40. The process flow advances to Step S50. When the first machining path in its entirety does not satisfy the allowable head angle, the determination is NO at Step S40. The process flow advances to Step S60.

Subsequently, at Step S60, in order to divide the first machining path in such a manner as to satisfy the division conditions described above, the machining-path generation unit 113 extracts, from the first machining path, all the regions in which the angle of the advancement direction of the machining head 10 relative to the direction in which the wire 5 is supplied exceeds the allowable head angle. That is, the machining-path generation unit 113 extracts, from the first machining path, all the regions in which the advancement direction of the machining head 10 does not satisfy the condition of allowable head angle.

Next, at Step S70, the machining-path generation unit 113 divides the first machining path in the extracted regions in such a manner that the advancement direction of the machining head 10 satisfies the condition of allowable head angle so as to generate a plurality of second machining paths. The second machining paths are divided machining paths that are obtained by dividing the first machining path. When Step S70 is ended, the process flow advances to Step S50.

At Step S50, the machining-program conversion unit 114 converts data of the first machining path generated at Step S30 or data of the second machining paths generated at Step S70 into a machining program, and adds a manufacturing code to the machining program. Due to this operation, the machining program that specifies on which path the machining head 10 is actuated in manufacturing an object is generated. The manufacturing code includes information on a command instructing the additive manufacturing device 100 to operate the beam nozzle 11, the wire nozzle 12, and the gas nozzle 13 in the procedure for manufacturing an object.

The steps described above are performed and thereby a machining path can be generated that is intended to execute control on the additive manufacturing device 100 in accordance with the additive manufacturing method explained in the first embodiment described above.

Therefore, the machining-path generation method according to the second embodiment includes a step of obtaining manufacturing-shape data that represents a manufacturing-target shape of an object, a step of generating a basic machining path from the manufacturing-shape data, and a step of generating, from the basic machining path, a plurality of machining paths that cover a machining path and in which the machining head 10 is moved in one direction along the direction of the central axis of a columnar build material supplied to the machining region 26 when motion of the machining head 10 is projected onto a plane perpendicular to the irradiation direction of the laser beam 24.

It is allowable that after having read the CAD data 120, the machining-path generation unit 113 automatically selects, on the basis of the CAD data 120, proper laminating-condition data 130 to be used for the above processes by the machining-path generation unit 113. In this case, a plurality of different types of laminating-condition data 130 are stored in a process map format in advance in the data storage unit 112 or the machining-path generation unit 113.

The process map stores the manufacturing conditions set for the additive manufacturing device 100 in association with the shape information such as a width and a height of line beads formed under these manufacturing conditions. That is, the process map is information indicating the relevancy between manufacturing conditions of a line bead set for the additive manufacturing device 100 and shape information on a line bead corresponding to these manufacturing conditions. In this case, the machining-path generation unit 113 can automatically select the laminating-condition data 130 simultaneously with generating the first machining path after having read the CAD data 120.

As described above, in the machining-path generation method according to the second embodiment, the CAM device 110 automatically determines and generates a machining path of the additive manufacturing device 100 to form a manufactured object in accordance with the additive manufacturing method described in the first embodiment. This can eliminate the user's need to create a machining path while taking into account the location where the machining path is divided and the machining sequence at the time of creating various types and dimensions of manufactured objects by using the additive manufacturing device 100.

The second machining paths generated by the CAM device 110 are displayed on a display device, which can save labor for checking the generated second machining paths by idle running of a real machine.

Therefore, in the machining-path generation method according to the second embodiment, a machining path that can improve the shape accuracy of a manufactured object can be automatically generated without imposing a burden on a user.

Third Embodiment

Figure 15:
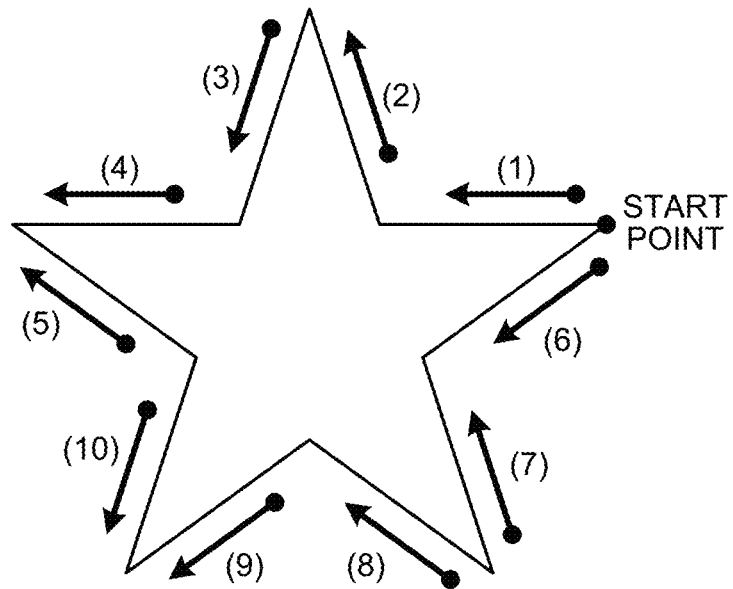
FIG. 15 is a diagram illustrating an example of divided machining paths for manufacturing a star-shaped object by the additive manufacturing device illustrated in FIG. 1.
Figure 16:
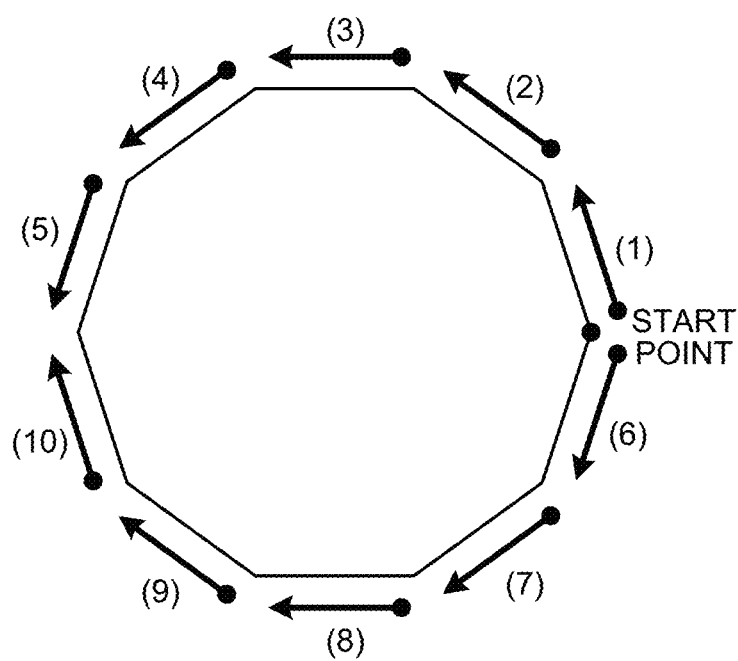
FIG. 16 is a diagram illustrating an example of divided machining paths for manufacturing a polygonal object by the additive manufacturing device illustrated in FIG. 1.
Figure 17:
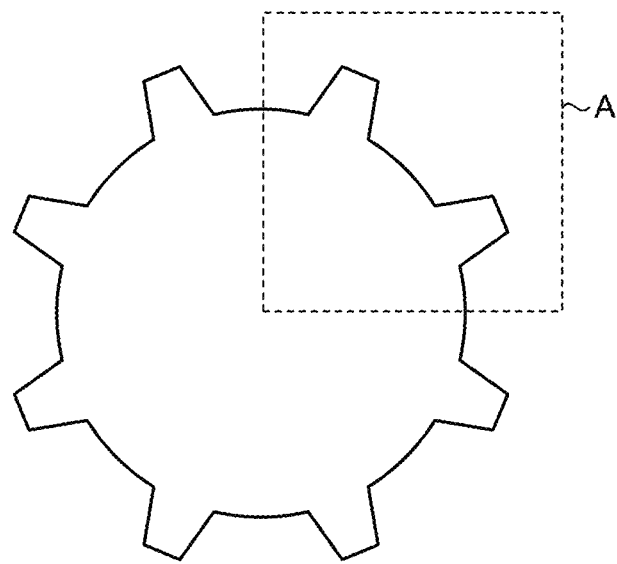
FIG. 17 is a diagram illustrating an example of a gear-shaped object to be manufactured by the additive manufacturing device illustrated in FIG. 1.
Figure 18:
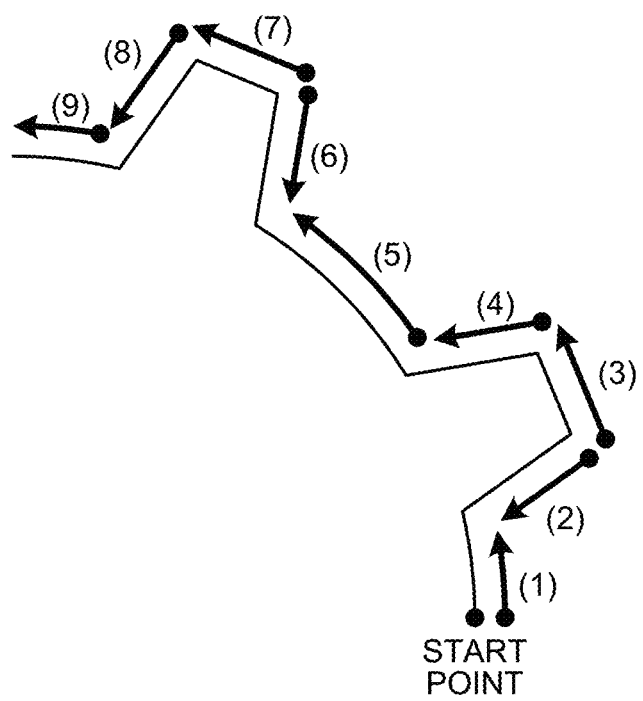
FIG. 18 is a diagram illustrating an example of divided machining paths for manufacturing a region of the gear-shaped object illustrated in FIG. 17 by the additive manufacturing device illustrated in FIG. 1.

In a third embodiment, a description is given of a machining path for manufacturing an object with other shapes made up of a closed curve when viewed in the irradiation direction of the laser beam 24 at the time of manufacturing machining. FIG. 15 is a diagram illustrating an example of divided machining paths for manufacturing a star-shaped object by the additive manufacturing device 100 illustrated in FIG. 1. FIG. 16 is a diagram illustrating an example of divided machining paths for manufacturing a polygonal object by the additive manufacturing device 100 illustrated in FIG. 1. FIG. 17 is a diagram illustrating an example of a gear-shaped object to be manufactured by the additive manufacturing device 100 illustrated in FIG. 1. FIG. 18 is a diagram illustrating an example of divided machining paths for manufacturing a region A of the gear-shaped object illustrated in FIG. 17 by the additive manufacturing device 100 illustrated in FIG. 1.

When the additive manufacturing device 100 manufactures a star-shaped object illustrated in FIG. 15, the additive manufacturing device 100 uses 10 machining paths including a second machining path (1) to a second machining path (10) as illustrated in FIG. 15. The second machining path (1) to the second machining path (10) can be generated by dividing a machining path by the method explained in the second embodiment described above.

When the additive manufacturing device 100 manufactures a polygonal object illustrated in FIG. 16, the additive manufacturing device 100 uses 10 machining paths including a second machining path (1) to a second machining path (10) as illustrated in FIG. 16. The second machining path (1) to the second machining path (10) can be generated by dividing a machining path by the method explained in the second embodiment described above.

When the additive manufacturing device 100 manufactures the region A of the gear-shaped object illustrated in FIG. 17, the additive manufacturing device 100 uses nine machining paths including a second machining path (1) to a second machining path (9) as illustrated in FIG. 18. The second machining path (1) to the second machining path (9) can be generated by dividing a machining path by the method explained in the second embodiment described above.

As described above, use of the additive manufacturing method according to the first embodiment can improve the shape accuracy also in manufacturing an object with a shape made up of a closed curve when viewed in the irradiation direction of the laser beam 24 other than manufacturing a circular object.

Fourth Embodiment

Figure 19:
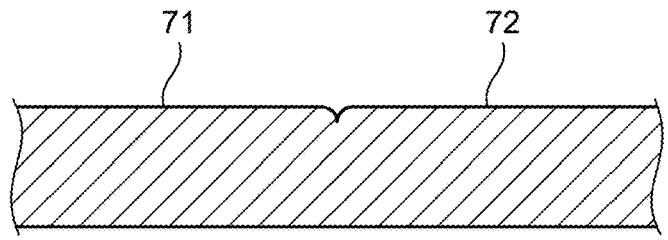
FIG. 19 is a schematic cross-sectional view illustrating an optimal connection state between edges of two line beads manufactured by the additive manufacturing device illustrated in FIG. 1.
Figure 20:
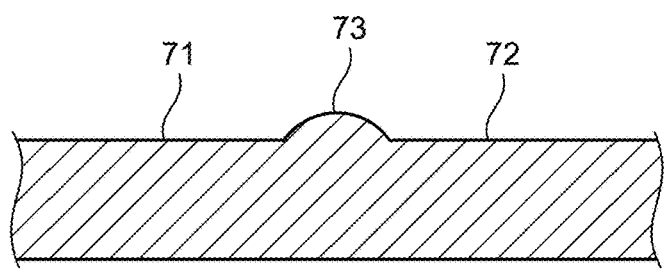
FIG. 20 is a schematic cross-sectional view illustrating a state where a bulging portion of two connected line beads manufactured by the additive manufacturing device illustrated in FIG. 1 has been generated because the edges of the two line beads are too close to each other.
Figure 21:
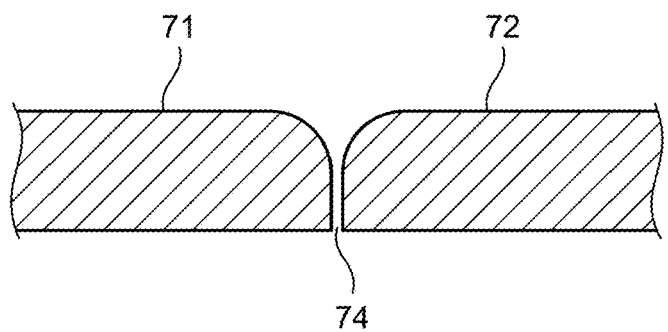
FIG. 21 is a schematic cross-sectional view illustrating a state where a gap has been generated between two line beads manufactured by the additive manufacturing device illustrated in FIG. 1 because the edges of the two line beads are too far from each other.

FIG. 19 is a schematic cross-sectional view illustrating an optimal connection state between edges of two line beads manufactured by the additive manufacturing device 100 illustrated in FIG. 1. FIG. 20 is a schematic cross-sectional view illustrating a state where a bulging portion 73 of two connected line beads manufactured by the additive manufacturing device 100 illustrated in FIG. 1 has been generated because the edges of these two line beads are too close to each other. FIG. 21 is a schematic cross-sectional view illustrating a state where a gap 74 has been generated between two line beads manufactured by the additive manufacturing device 100 illustrated in FIG. 1 because the edges of these two line beads are too far from each other.

In a case where the machining head 10 is moved along the second machining paths described above to perform additive machining, at the meeting point of two adjacent line beads where the beginning edge of one line bead 71 meets the ending edge of another line bead 72 or where the ending edge of one line bead 71 meets the beginning edge of another line bead 72, it is preferable that the edges of these two line beads are connected to each other in the state as illustrated in FIG. 19. However, if the edges of the two line beads are too close to each other, the bulging portion 73 of the connected line beads is generated as illustrated in FIG. 20. If the edges of the two line beads are too far from each other, the gap 74 is generated between the line beads as illustrated in FIG. 21. It has been found through experiment conducted by the present inventors that it is very difficult to control the bulging amount at the meeting point of two line beads by means of adjusting the overlap amount of the two line beads in the longitudinal direction.

Thus, the overlap amount of the two line beads in the longitudinal direction is made constant, while the melting amount of the wire 5 is made variable by changing the manufacturing conditions at the beginning and ending edges of the line beads. This makes it possible to minimize the generation of the bulging portion 73 of the connected line beads and the generation of the gap 74 between the line beads.

Examples of the manufacturing conditions that can be changed at the beginning and ending edges of the line beads include a laser output that is an output of the laser beam 24. It is possible to reduce the height of the line beads during solidification by reducing the laser output at the beginning and ending edges of the line beads to reduce the melting amount of the wire 5 or conversely by increasing the laser output at the beginning and ending edges of the line beads to increase the amount of heat input to the wire 5 so as to reduce the kinematic viscosity of the line beads in a melting state.

Examples of the manufacturing conditions that can be changed at the beginning and ending edges of the line beads also include a wire supply rate. It is possible to reduce the height of the line beads during solidification by gradually reducing the wire supply rate at the beginning and ending edges of the line beads. It is also allowable to employ both the laser output and the wire supply rate.

In order to accommodate various constraints to the additive manufacturing, a user is allowed to flexibly select and use the above methods and the like. Specifically, the function of additionally setting an increase or a decrease in manufacturing conditions that can be changed at the beginning and ending edges of the line beads is added to the start and end of the machining program.

Figure 22:
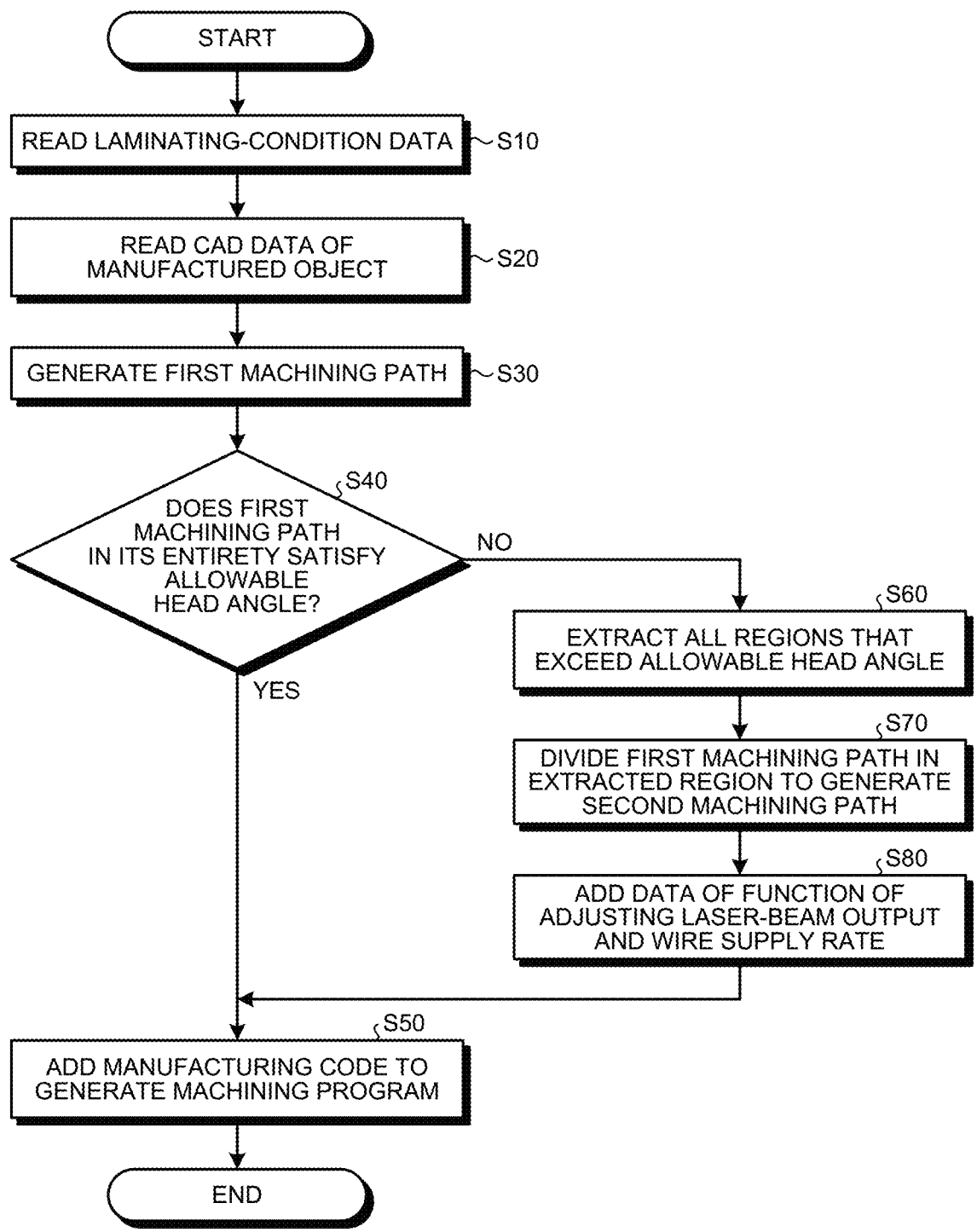
FIG. 22 is a flowchart illustrating a machining-program generation process procedure for a machining program with an adjustment function capable of adjusting an increase or a decrease in manufacturing conditions that can be changed at beginning and ending edges of beads.

FIG. 22 is a flowchart illustrating a machining-program generation process procedure for a machining program with an adjustment function capable of adjusting an increase or a decrease in manufacturing conditions that can be changed at the beginning and ending edges of the beads. The flowchart illustrated in FIG. 22 includes Step S80 in addition to the steps in the flowchart illustrated in FIG. 14. At Step S80, the machining-program conversion unit 114 adds data of the adjustment function capable of adjusting an increase or a decrease in output of the laser beam 24 and wire supply rate to each data of the second machining paths generated at Step S70.

Thereafter, at Step S50, the machining-program conversion unit 114 converts data of the first machining path generated at Step S30 or data of the second machining paths generated at Step S80 into a machining program, and adds a manufacturing code to the machining program.

The additive manufacturing device 100 manufactures an object by using the machining program generated in the manner as described above. This makes it possible to easily change the manufacturing conditions at the intersection of line beads, at the meeting point of the beginning and ending edges of the line beads, or other points. If the manufacturing is continued under the original manufacturing conditions without changing associated conditions, at a point such as the intersection of line beads where the line beads extending from different directions overlap each other, the amount of material to be laminated is increased by the amount of overlap. This results in an increase in width or height of the line beads. When the manufacturing conditions can be changed easily, the width and height of the line beads can be changed minutely by reducing the amount of the wire 5 to be supplied to the overlap portion of the line beads or by setting the lower limit of the laser output.

Therefore, according to the fourth embodiment, the connection state between two adjacent line beads when the additive manufacturing method according to the first embodiment is used can be improved and thus the shape accuracy in manufacturing an object can be improved.

The configurations described in the above embodiments are only examples of an aspect of the present invention. The configurations can be combined with other well-known techniques and part of the configurations can be omitted or modified without departing from the scope of the present invention.

REFERENCE SIGNS LIST

1 control device, 2 laser oscillator, 3 fiber cable, 4 rotational motor, 5 wire, 6 wire spool, 7 gas supply device, 8 pipe, 10 machining head, 11 beam nozzle, wire nozzle, 13 gas nozzle, 14 head drive device, 15 stage, 16 rotational mechanism, 17 base material, 18 deposit, 19 wire supply unit, 22 target surface, 24 laser beam, 25 shield gas, 26 machining region, 41 CPU, 42 RAM, 43 ROM, 44 external storage device, 45 input/output interface, 46 bus, 50 bead, 51 laser-beam irradiation region, 61 first semicircular machining path, 62 second semicircular machining path, 71 one line bead, 72 another line bead, 73 bulging portion, 74 gap, 100 additive manufacturing device, 110 CAM device, 111 data input unit, 112 data storage unit, 113 machining-path generation unit, 114 machining-program conversion unit, 120 CAD data, 130 laminating-condition data, 200 additive manufacturing system.

The invention claimed is:

1. An additive manufacturing method using an additive manufacturing device to perform additive machining, the method comprising:
   controlling a machining head that includes a nozzle to supply a columnar build material to a machining region on a target surface;
   controlling a beam nozzle to irradiate the machining region with a beam that melts the build material supplied to the machining region, the nozzle and the beam nozzle being provided non-coaxially with each other;
   performing the additive machining along a desired machining path in a state where the machining head is located with a central axis of the beam and a central axis of the columnar build material being positioned on a single vertical plane;
   dividing the desired machining path into a plurality of divided machining paths each including a curved portion in such a manner that for the entirely of each of the plurality of divided machining paths the machining head is moved in only one of a positive direction and a negative direction with respect to a direction of a central axis of the columnar build material supplied to the machining region when motion of the machining head is projected onto a plane perpendicular to an irradiation direction of the beam; and
   moving the machining head along each of the divided machining paths to perform the additive machining.

2. An additive manufacturing device to perform additive machining by controlling a machining head that includes a nozzle to supply a columnar build material to a machining region on a target surface, a beam nozzle to irradiate the machining region with a beam that melts the build material supplied to the machining region, and a gas nozzle to spray gas toward the machining region in order to suppress oxidization of the build material and cool the build material, the nozzle and the beam nozzle being provided non-coaxially with each other, a relative positional relation between the nozzle, the gas nozzle, and the beam nozzle being fixed by the machining head, wherein
   when the additive manufacturing device performs additive machining along a desired machining path in a state where the machining head is located with a central axis of the beam and a central axis of the columnar build material being positioned on a single vertical plane, the additive manufacturing device is configured to divide the machining path into a plurality of divided machining paths each including a curved portion in such a manner that for the entirety of each of the plurality of divided machining paths the machining head is moved in only one of a positive direction and a negative direction with respect to a direction of a central axis of the columnar build material supplied to the machining region when motion of the machining head is projected onto a plane perpendicular to an irradiation direction of the beam, and moves the machining head along each of the divided machining paths to perform additive machining.

3. The additive manufacturing device according to claim 2, wherein the columnar build material is either a wire-like build material or a powdered build material.

4. The additive manufacturing method according to claim 1, further comprising:
dividing the machining paths in such a manner that an angle of an advancement direction of the machining head relative to a direction in which the columnar build material is supplied when motion of the machining head is projected onto a plane perpendicular to an irradiation direction of the beam falls within a predetermined range of allowable head angle for the entirety of each of the plurality of divided machining paths.

5. The additive manufacturing method according to claim 4, wherein the predetermined range of allowable head angle is from 90° to −90°.

6. The additive manufacturing device according to claim 2, wherein the gas nozzle is provided on an outer peripheral side of the beam nozzle on the plane perpendicular to the irradiation direction of the beam such that the gas nozzle is coaxial with the beam nozzle.

7. The additive manufacturing method according to claim 1, wherein each of beginning and ending edges of each of the plurality of divided machining paths is connected to a beginning edge or an ending edge of a different one of the plurality of divided machining paths.

\* \* \* \* \*